United States Patent [19]

Wright

[11] Patent Number: 4,928,029
[45] Date of Patent: May 22, 1990

[54] IN-SPINDLE MOTOR ASSEMBLY FOR DISK DRIVE AND METHOD FOR FABRICATING

[75] Inventor: Harold T. Wright, San Carlos, Calif.

[73] Assignee: Maxtor Corporation, San Jose, Calif.

[21] Appl. No.: 247,773

[22] Filed: Sep. 22, 1988

Related U.S. Application Data

[62] Division of Ser. No. 20,130, Feb. 27, 1984, Pat. No. 4,814,652.

[51] Int. Cl.⁵ .................. H02K 5/00; G11B 5/012
[52] U.S. Cl. ............................ 310/89; 29/596; 310/67 R; 360/99.08
[58] Field of Search ............. 310/67 R, 89, 154, 156, 310/261; 360/99.08, 49.07; 29/596

[56] References Cited

U.S. PATENT DOCUMENTS

| | | | |
|---|---|---|---|
| 4,535,373 | 8/1985 | Schuh | 360/99.08 |
| 4,554,473 | 11/1985 | Müller | 310/67 R |
| 4,607,182 | 8/1986 | Ballhaus | 360/99.08 |
| 4,658,312 | 4/1987 | Elasässer et al. | 360/99.08 X |
| 4,717,977 | 1/1988 | Brown | 360/98.07 |
| 4,731,554 | 3/1988 | Hall et al. | 310/156 |
| 4,739,427 | 4/1988 | Kilmer et al. | 360/98.07 |
| 4,814,652 | 3/1989 | Wright | 310/67 R |

Primary Examiner—Patrick R. Salce
Assistant Examiner—D. L. Rebsch
Attorney, Agent, or Firm—Hecker & Harriman

[57] ABSTRACT

An in-spindle disk drive motor incorporating a novel two-piece aluminum spindle and a method for fabricating the same. The spindle is hollow and contains a removable steel flux sleeve on which plastic permanent magnets are mounted. The spindle is mounted by means of two bearings to a non-rotating stator shaft disposed through the center of the spindle and rigidly attached to a disk drive base. One of the bearings is located in a removeable bearing sleeve at the top of the spindle and the other is located beyond the steel sleeve at the bottom end of the spindle. The aluminum spindle eliminates thermal distortion effects caused in prior art in-spindle motors by thermal expansion differences between aluminum disks and non-aluminum spindles.

6 Claims, 3 Drawing Sheets

IN-SPINDLE MOTOR ASSEMBLY FOR DISK DRIVE AND METHOD FOR FABRICATING

This is a divisional of application Ser. No. 020,130 filed Feb. 27, 1987 now U.S. Pat. No. 4,814,652.

BACKGROUND

1. Field of the Invention

This invention relates to disk drives for computers and, more specifically, to spindle motors for "Winchester" hard disk drives.

2. Prior Art

Disk drive memory systems ("disk drives") have been used to store information for computers for many years. In disk drives, digital information is recorded on concentric memory tracks on magnetic disks. There are two basic kinds of disk drives: "floppy" disk drives and "hard" disk drives. In both kinds of disk drives, disks are rotatably mounted on a spindle. Read/write heads, generally located on pivoting arms, move radially over the surface of the disks to access different memory locations. There may be as many as 300 or more memory tracks per radial inch of a disk. To insure proper writing and reading of information, a read/write head must be accurately aligned with an appropriate track on a disk. Floppy disk drives store information on interchangeable, flexible and magnetic disks. Hard disks store information on rigid non-interchangeable, disks, commonly made of alumimum. Hard disks have a much higher storage density than floppy disks. Hard disks are often located within the housing of a computer and may consist of multiple rigid metal disks stacked on top of each other within the drive. The disks are spun at high speed by a motor to allow rapid writing and reading of information on the disk. Because of the high storage densities of hard disks, it is extremely important that distortions and misalignments of the disks, and of the disks in relation to the motor spindle, be minimized to allow accurate information exchange between the read/write head and the disk.

In most instances, hard disks are driven by an electric motor located below the spindle on which the hard disks are mounted. Spindle motors have also been disclosed that incorporate the drive motor within the spindle itself. Such an in-spindle motor is described in copending application Ser. No. 444,465, now abandoned, filed Nov. 24, 1982 and assigned to the assignee of the present invention. In-spindle motors require less space than external motors, allowing for the construction of compact disk drive assemblies. In in-spindle motors the spindle forms part of the actual motor. To produce the required electromagnetic characteristics, present designs for in-spindle motors have required the use of spindles made of steel or other ferromagnetic materials. Magnets are mounted to the spindle such that the spindle forms a flux path for the magnets. Such a flux path is necessary to produce the amount of torque required to spin the disk assembly.

The use of a steel spindle with aluminum disks, however, leads to distortion and misalignment of the disks due to the differing thermal expansion coefficients of steel and aluminum (the coefficient for aluminum is about 1.6 times that of steel). As the temperature rises, the spindle, made of steel, expands more slowly than the disks, made of aluminum. In the radial direction, when the temperature is reduced, the diameter of the spindle decreases more slowly than the inside diameter of the disks, creating an interference between the spindle and the mounting hole of the disk that can lead to radial displacement of the disks. Both of these effects can cause a shift in the position of the magnetic memory tracks, leading to potential misalignment between a disk and the corresponding read/write head. This misalignment limits the storage density of the disks by placing a limit on how closely memory tracks can be spaced.

To compensate for these thermal expansion effects, some prior art devices use spacers and rings made of materials that, in combination with the aluminum disks, attempt to produce the same net thermal expansion in the disk stack a in the spindle.

SUMMARY OF THE INVENTION

The present invention consists of an in-spindle disk drive motor incorporating an aluminum spindle and a method for fabricating such motor. The spindle is hollow and contains a removable steel sleeve within which the motor's magnets are mounted. The spindle is mounted by means of two bearings to a non-rotating shaft disposed through the center of the sleeve and rigidly attached to the disk drive base. One of the bearings is located in a removable bearing sleeve at the top of the spindle and the other is located beyond the steel sleeve at the bottom end of the spindle.

Because the spindle is primarily aluminum, as are the memory disks, thermal distortion caused by differences in the coefficient of thermal expansion between the spindle and the memory disks is eliminated. As a result, positioning errors are reduced, and higher storage densities than obtainable with the prior art can be attained. The removable bearing sleeve also allows for easy access to the spindle motor for inspection and servicing or for replacement of the bearings, while maintaining the accurate alignment of the spindle and the shaft.

DETAILED DESCRIPTION OF THE INVENTION

An improved in-spindle disk drive motor is disclosed. In the following description, for purposes of explanation, numerous details are set forth, such as specific materials, arrangements and proportions in order to provide a thorough understanding of the present invention. However, it will be apparent to one skilled in the art that the invention may be practiced without these specific details. In other instances, well known components of disk drives, such as disks, read/write heads, bearings and seals have not been described in detail in order not to obscure the present invention unnecessarily. In the following discussion, the same number is used to designate like elements throughout the drawings.

Figure 1:
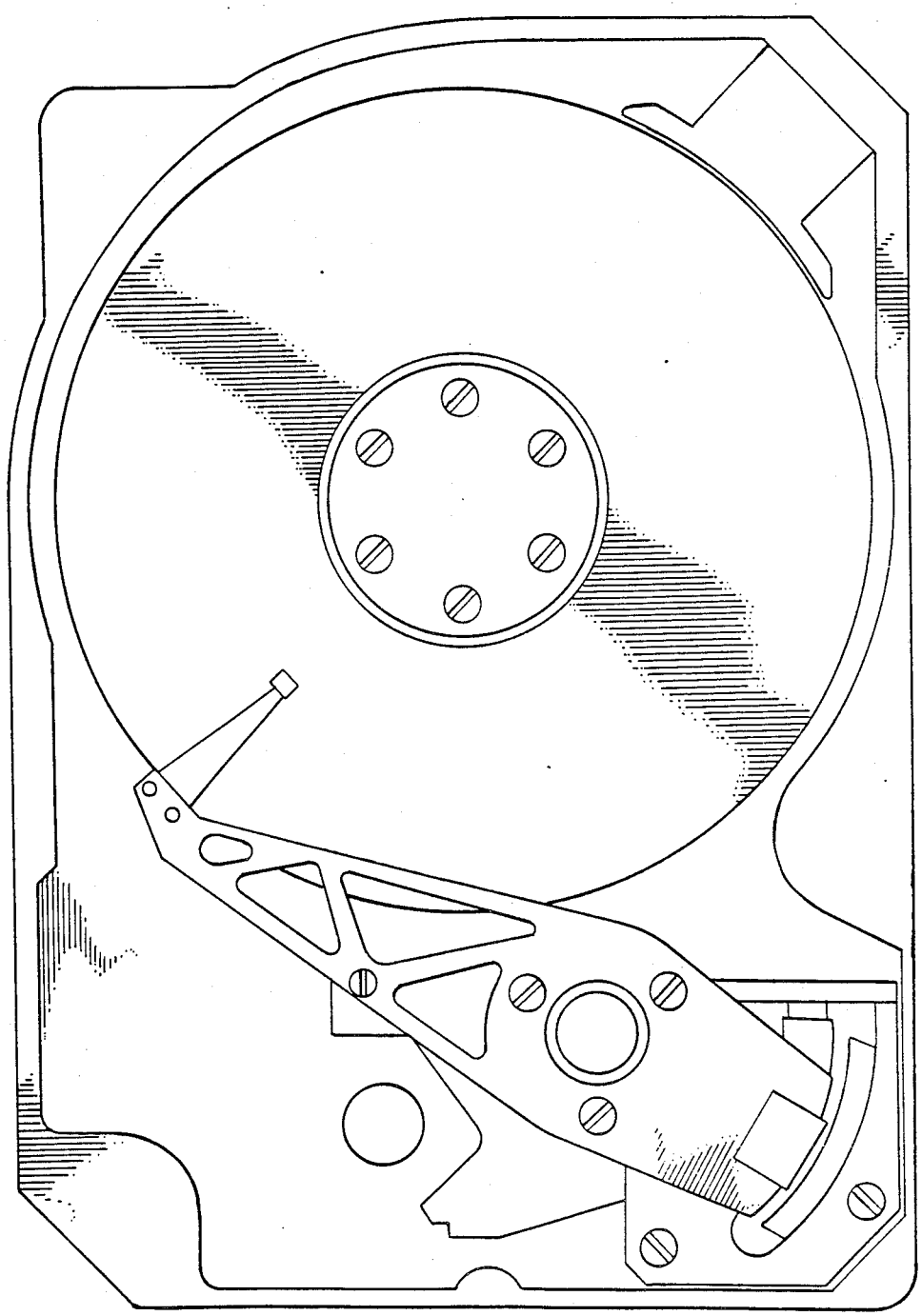
FIG. 1 is a plan view of a typical disk drive assembly.

Referring first to FIG. 1, this figure illustrates the layout of a typical hard disk drive mechanism. A hard disk drive typically consists of a base 30, a spindle 31 containing a stack of one or more disks 32, and an arm 33, containing read/write heads 35, that rotates about pivot point 34. Not shown in this Figure is the motor used to drive the spindle. The spindle motor is generally located under the spindle 31 and below the base 30. Such a position is disadvantageous because the motor juts out below what could otherwise be a compact disk drive package.

In the present invention, however, the spindle motor is not located below the base but is located within the spindle itself. The result is a slim disk drive package without an awkward "hump" below the base that has a simple rectangular envelope and that can fit into compact spaces. Since less space is taken up by the motor, more or larger disks, and hence a greater amount of storage capacity, can be incorporated in a disk drive package.

Figure 2:
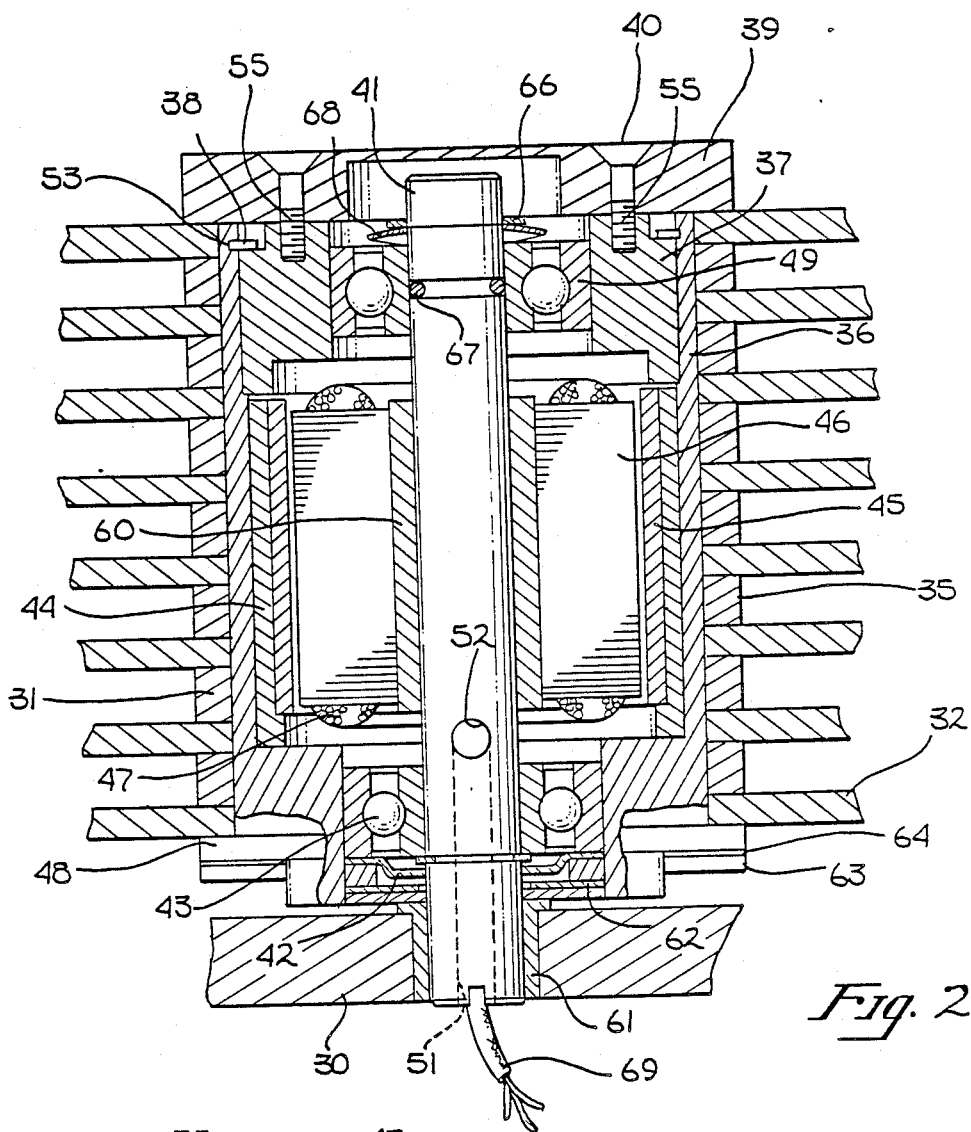
FIG. 2 is a sectional view of the spindle assembly taken substantially along line 2—2 of FIG. 1.
Figure 4:
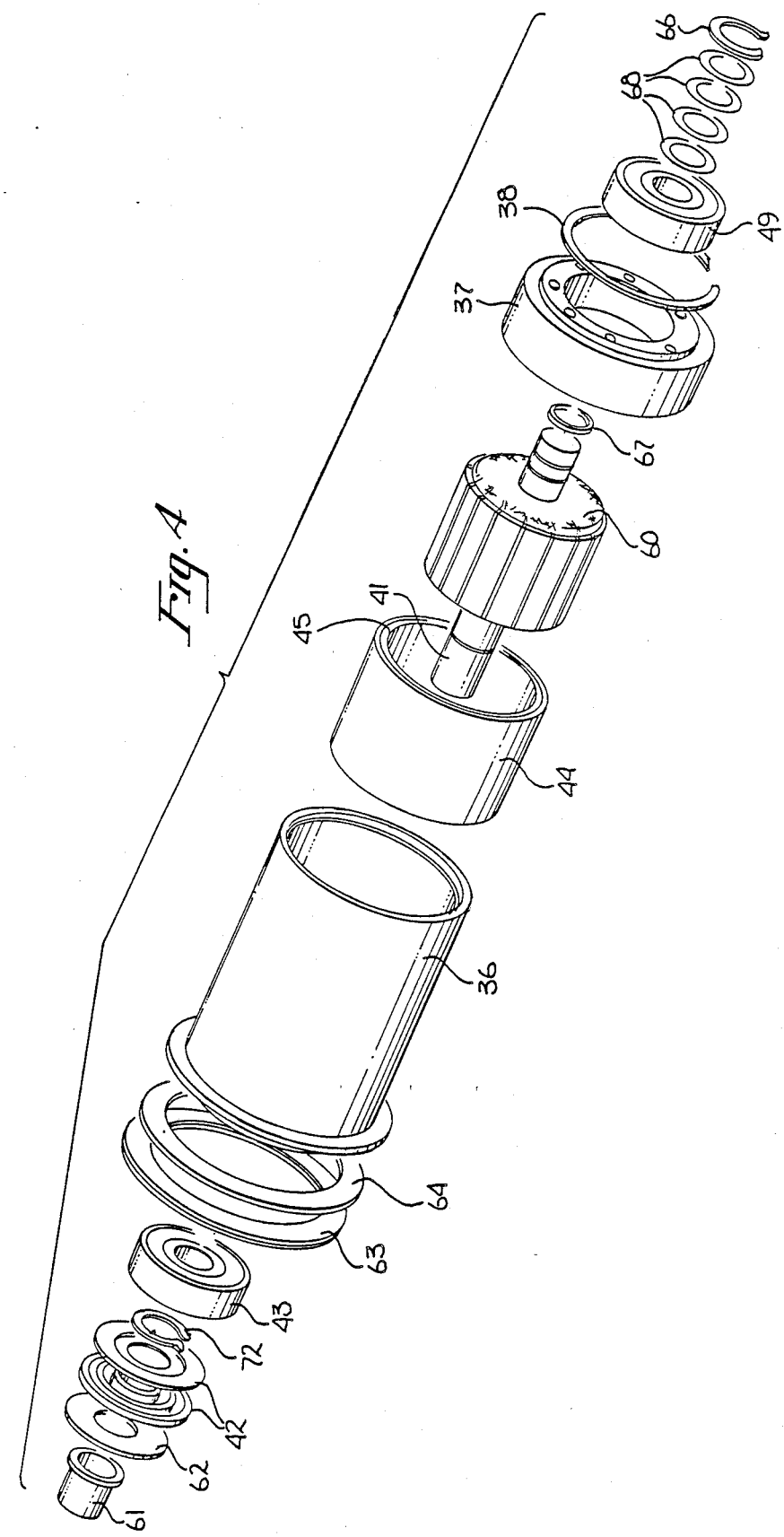
FIG. 4 is an exploded isometric view of the present inventive motor.

The spindle assembly of the present invention is shown in greater detail in FIGS. 2 and 4. A disk stack consisting of disks 32 and spacer rings 35, both preferably comprising of aluminum, are mounted on spindle 31 such that the bottom most disk rests on flange 48. Alternatively, an additional spacer may be disposed between the bottom-most disk and the flange. Clamping plate 39, attached to the top of spindle 31 by means of screws 40, secures the disk stack to the spindle.

Spindle 31 comprises spindle hub 36 and end cap 37. They are both made of the same material as the disks 32 and spacers 35 (preferably aluminum) such that no thermal distortions or misalignments are produced in the disks. Spindle hub 36 consists of a predominantly hollow cylinder having a flange 48 at one end and being primarily open at the other end. The flanged end contains a bore for mountinq bearing 43. End cap 37 is mounted to the open end of spindle hub 36. End cap 37 contains a bore for bearing 49, and in the preferred embodiment consists of a circular plug that is telescopingly engageable with the end of spindle hub 36. In the present preferred embodiment, there is a slight interference fit between end cap 37 and spindle hub 36 such that end cap 37 is accurately aligned with spindle hub 36 once it is inserted in the spindle hub's open end, and hence bearing 49 is automatically aligned with bearing 43. This automatic alignment between bearings 43 and 49 due to the precise engagement of end cap 37 with spindle hub 36 adds to the ease of fabrication and reliability of the present invention.

Figure 3:
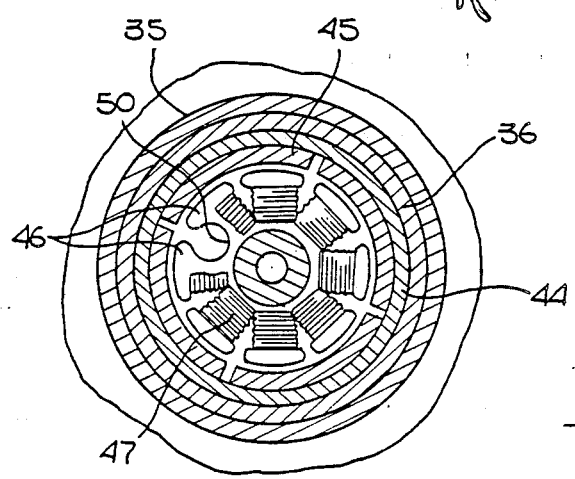
FIG. 3 is a sectional view of the spindle motor taken substantially along line 3—3 of FIG. 2.

The inside of spindle 31 contains magnet sleeve 45 and flux sleeve 44 as shown more clearly in FIG. 3. Magnet sleeve 45 comprises a four poled arcuate, high flux density magnet structure bonded to the inside of cylindrical flux sleeve 44. In the preferred embodiment, magnet sleeve 45 comprises a ring of Xolox Neobond ® 50 plastic between 60 and 80 mils thick that has been magnetized to exhibit four separate magnetic poles. In the preferred embodiment, magnet sleeve 45 is plastic bonded to flux sleeve 44.

Flux sleeve 44 is a cylindrical sleeve, formed of a ferromagnetic material, preferably low carbon steel, that provides a flux path for the magnets. In the preferred embodiment it is between 60 and 80 mils thick. Flux sleeve 44 is attached to the inside of spindle hub 36 by any appropriate mechanical or adhesive fastening means, and is preferably plastic bonded. The bonding means should be flexible enough to allow for the differential thermal expansion coefficients of the spindle hub 36 and the flux sleeve 44 without degrading the strength of the bond and without causing distortion in spindle hub 36, the walls of which, adjacent to flux sleeve 44, have a thickness in the preferred embodiment of between 80 and 100 mils.

The use of high flux density magnet sleeve 45 in combination with flux sleeve 44 produces a thin walled magnetic structure that produces an exceptionally powerful magnetic field. In the prior art, an equal amount of magnetic flux could only be produced by using much thicker magnets. To allow the disk drive motor to be located within the standard dimensions of a disk drive spindle, and to leave sufficient space within the core of the spindle for the stator coils, it was typically necessary to use the spindle hub itself as the flux path. As a result, the spindle hub typically was constructed of steel or another ferromagnetic material, which led to the problems of undesirable thermal expansion described above. In the present invention, an as equally powerful magnetic field can be produced with a magnet sleeve that is thinner and has a smaller diameter than prior art magnets. As a result, the spindle hub itself does not have to function as a flux path, and the spindle hub can be made of the same material as the disk stack. Thermal expansion problems between the spindle and the disks are therefore eliminated.

Again, referring to FIG. 2, the bottom of the spindle hub 36 also includes a thin, annular commutator flux ring 64 and arcuate commutator magnets 63. The communtator magnets 63 cooperate with hall effect sensor 73 mounted to base 30 to control switching of the current supplied to stator coils 47 as is well-known in the art.

Spindle 31, including spindle hub 36, end cap 37, flux sleeve 44 and magnet sleeve 45, is mounted by means of bearings 43 and 49 to stator shaft 41. Stator shaft 41 is rigidly mounted to base 30 and provides the axis around which the spindle assembly rotates. As shown in FIGS. 2 and 3, stator shaft 41 supports a stack of laminated stator plates 46 having circular cutouts 50 located around their periphery. Copper wire is wound through the cutouts 50 forming stator coils 47, as is well-known in the electric motor art. In the preferred embodiment, stator shaft 41 has an axial hole 51 and a radial hole 52 to allow the terminal leads 69 of the windings to extend through stator shaft 41 and out through base 30.

In the present preferred embodiment the spindle motor of the present invention is assembled as follows. Lower bearing 43 and upper bearing 49 are mounted in spindle hub 36 and end cap 37, respectively, by heating spindle hub 36 and end cap 37 to the highest operating temperature of the motor, sliding the bearings into their respective bores, and applying an adhesive sealent such as Loctite ® to the bearing/bore interface. By installing the bearings in this manner, registration of the bearings in their bores is assured over the entire operating temperature range of the spindle motor assembly despite differing coefficients of thermal expansion between the bearings, preferably steel, and the spindle hub 36 and end cap 37, preferably aluminum.

Next, the four individual arcuate magnets comprising magnet sleeve 45 are bonded by means of an epoxy adhesive to the inside surface of flux sleeve 44 such that adjacent pieces have oppositely facing north and south magnetic poles. A thin film of epoxy is then spread on about 50% of the inside mating surface of spindle hub 36, and the magnet/flux sleeve assembly is installed inside.

The commutator magnets 63 are then mounted with an epoxy adhesive to the bottom of flange 48 such that they line up with the poles of the magnets comprising magnet sleeve 45.

Next, the stator assembly, comprising stator shaft 41, stator plates 46, and stator coils 47, is installed into spindle hub 36. The bottom of stator shaft 41 is inserted into the bore of lower bearing 43, and after the bottom of stator shaft 41 has been pressed far enough through bearing 43, split retaining ring 72 is installed onto the end of stator shaft 41 protruding below lower bearing 43. Adhesive sealant, such as Loctite® or a similar adhesive is applied to the shaft/bearing bore interface to bond the shaft and bearing together. After installing O-ring 67 and applying a lubricant to the top of stator shaft 41, end cap 37 containing upper bearing 49 is installed over stator shaft 41 and telescoped into spindle hub 36.

A pair of Belleville washers 68 are placed over the end of stator shaft 41 and held in place by retaining ring 66. Split ring 38 is installed into the upper end of spindle hub 36 to restrain end cap 37.

In the present preferred embodiment, the spindle assembly is balanced by epoxing a piece of wire into the gap of split ring 38. Because of the light weight of the aluminum its inherent symmetry, in most cases no other balancing is required (as opposed to the prior art, where the steel spindle, which is much heavier than the spindle of the present invention, required careful balancing after assembly to prevent vibration at the operating speeds of the motor).

The two-piece spindle housing design of the present invention also allows easy access to the spindle motor for inspection and servicing of the bearings, the stator, and the magnet/flux ring assembly. To inspect the inside of the spindle, screws 40 and clamping plate 39 are removed. Next, split ring 38, retaining ring 66, and Belleville washers 68 are removed, and end cap 37 together with upper bearing 49 is pulled off stator shaft 41 and out of spindle sleeve 36. A conventional gear puller, attached to screw holes 55 may be used. Once end cap 37 has been removed, the stator assembly can be pulled from spindle hub 36. Once the stator has been removed, lower bearing 43, magnet sleeve 45, and flux sleeve 44 are accessible.

Accordingly, an improved in-spindle motor for disk drive memory systems for computers has been presented. The invention allows an in-spindle disk drive memory system for computers to operate with an absence of thermal distortion and dislocation that was not possible with the prior art. Although specific details are described herein, it will be understood that various changes can be made in the materials, details, arrangements, and proportions of the various elements of the present invention without departing from the scope of the invention. For example, although the specification refers primarily to magnetic aluminum memory disks and an aluminum spindle, it is envisioned that the invention can also be used with laser memory disks, in which case the spindle need not be made of aluminum but may be made of thermoplastic, a ceramic, or any other suitable material. It will also be evident that the magnet/flux sleeve assembly of the present invention is not limited to use with disk drives, but allows the use of a wide variety of non-ferromagnetic materials for fabrication of the spindle of fixed shaft electric motors with rotating spindles in which it is desired to keep the outside diameter of the spindle to a minimum without compromising motor power. Other variations of the invention will be apparent to those skilled in the art.

I claim:

1. A motor assembly for use in Winchester hard disk drives comprising:
   a motor shaft;
   a stator affixed to said motor shaft, sad stator having electrical coil windings and being disposed about a longitudinal axis of said motor shaft;
   a first hollow cylinder disposed about, and substantially aligned with, said motor shaft, said first hollow cylinder having a bore at a first end and inner and outer walls;
   a second hollow cylinder disposed within said first hollow cylinder and being substantially aligned with said motor shaft, said second hollow cylinder having inner and outer walls;
   a magnet means attached to said inner wall of said second hollow cylinder, said magnet means being disposed adjacent said stator;
   said first hollow cylinder comprising a nonferromagnetic material and said second cylinder comprising a ferromagnetic material such that said second cylinder acts as a flux path for said magnet means;
   an end cap means engageable with said second end of said first hollow cylinder, said end cap means having a bore disposed about said longitudinal axis of said stator shaft;
   said first hollow cylinder and said end cap means having substantially the same coefficient of thermal expansion.

2. The motor assembly of claim 1 wherein said first hollow cylinder rotatably supports at least one magnetic disk, and said first hollow cylinder and said at least one disk have substantially the same coefficient of thermal expansion.

3. The motor assembly at claim 2 wherein said non-ferromagnetic material is aluminum.

4. The motor assembly of claim 3 wherein said magnet means comprises a permanent plastic magnet in the form of a third hollow cylinder, said magnet means being epoxy bonded to said second hollow cylinder.

5. The motor assembly of claim 4 wherein said outer wall of said second hollow cylinder is immediately adjacent to said inner wall of said first hollow cylinder.

6. The motor assembly of claim 5 wherein said first cylinder includes a bearing means located between a first end of said motor shaft and said bore of said first hollow cylinder.

* * * * *